US009241364B2

(12) United States Patent
Ronneke et al.

(10) Patent No.: US 9,241,364 B2
(45) Date of Patent: Jan. 19, 2016

(54) METHOD FOR REVOCABLE DELETION OF PDN CONNECTION

(71) Applicant: Telefonaktiebolaget L M Ericsson (publ), Stockholm (SE)

(72) Inventors: Hans Ronneke, Kungsbacka (SE); Zu Qiang, Kirkland (CA); Yong Yang, Molndal (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 14 days.

(21) Appl. No.: 13/805,088

(22) PCT Filed: Nov. 27, 2012

(86) PCT No.: PCT/EP2012/073744
§ 371 (c)(1),
(2) Date: Dec. 18, 2012

(65) Prior Publication Data
US 2014/0050132 A1  Feb. 20, 2014

Related U.S. Application Data
(60) Provisional application No. 61/667,627, filed on Jul. 3, 2012.

(51) Int. Cl.
H04W 76/04 (2009.01)
H04W 76/02 (2009.01)
H04W 4/00 (2009.01)
H04L 29/12 (2006.01)

(52) U.S. Cl.
CPC ......... *H04W 76/041* (2013.01); *H04L 61/2007* (2013.01); *H04W 4/005* (2013.01); *H04W 76/02* (2013.01); *H04W 76/04* (2013.01); *H04L 61/6068* (2013.01); *H04W 76/028* (2013.01)

(58) Field of Classification Search
CPC ..... H04W 76/04; H04W 36/14; H04W 80/04; H04W 76/062; H04W 88/16
USPC ........... 370/310, 331, 328, 329, 401; 455/436
See application file for complete search history.

(56) References Cited

U.S. PATENT DOCUMENTS

2008/0253383 A1* 10/2008 Sehgal et al. .................. 370/401
2012/0147839 A1*  6/2012 Yin et al. ...................... 370/329

FOREIGN PATENT DOCUMENTS

EP  2317822 A1  5/2011

OTHER PUBLICATIONS

International Search Report and Written Opinion dated Apr. 18, 2013, 13 pages.

* cited by examiner

*Primary Examiner* — Jamal Javaid
(74) *Attorney, Agent, or Firm* — Rothwell, Figg, Ernst & Manbeck, P.C.

(57) ABSTRACT

The invention relates to a method of operating a network node in a telecommunication network, such as an MME. The method comprising: initiating a PDN connection revocable deletion procedure for a device when at least one predetermined criterion is fulfilled; sending a PDN connection revocable deletion request to another network node; receiving a PDN connection revocable deletion response message from said other second network node; and storing data indicating that a PDN connection with said device is revocably deleted.

20 Claims, 4 Drawing Sheets

METHOD FOR REVOCABLE DELETION OF PDN CONNECTION

CROSS-REFERENCE TO RELATED APPLICATIONS

This application is a 35 U.S.C. §371 National Phase application from international application PCT/EP2012/073744, filed Nov. 27, 2012, and designating the United States, which international application claims priority to U.S. Provisional Application No. 61/667,627, filed Jul. 3, 2012; this application also claims the benefit of U.S. Provisional Application No. 61/667,627, filed Jul. 3, 2012. The above-identified applications are incorporated by reference herein.

TECHNICAL FIELD

The present invention relates to a method of operating a network node in a telecommunication network, such as an MME.

The present invention also relates to a network node for a telecommunication network, such as an MME.

The invention generally relates to the field of 3GPP telecommunication networks. In particular, it relates to PDN connections in such networks.

BACKGROUND

3GPP is currently investigating enhancement of machine type device communication (MTC) for release 12.

One category of machine type devices are defined as only requiring "infrequent communication", that is, they only communicate very seldom, e.g. one or a few IP packets a week or a month. The number of this type of devices can be huge, several times more than the normal type of terminals in the network. Therefore using normal network procedures for these devices may require disproportional large amount of network resources and hence optimizations are needed. Optimizations are also needed to avoid the risk of network overloading from these large numbers of devices.

The requirement from operators is to reduce the resource usage for devices that only communicate very rarely and stay silent for long times. In particular it can be noted that maintaining the default PDN connection in EPS networks is seen as a costly resource usage. But the optimization is of course also needed for devices with more than one (the default) PDN connection.

Some operators have suggested to establish the PDN connection and allocate resources in the PGW and SGW only at the rare occasions when communication from or to these type of devices is actually done. In this way, no memory resources or other resources are allocated in the PGW and SGW at all, and no mobility (MM) related signaling is required between the MME and SGW/PGW when the devices are moving. By keeping the devices attached (registered) in the network, the devices can be reached in case of mobile terminated (MT) communication e.g. from an SCS/MTC Server.

There are some requirements specified in stage 1 document, TS 22.368: "*The system shall provide mechanisms to efficiently maintain connectivity for a large number of MTC Devices.*" and "*MTC Devices may keep their data connection or not keep their data connection when not communicating, depending on operator policies and MTC Application requirements.*"

Another feature that is also being discussed in 3GPP SA2 is a new UE state mode, a so-called sleep mode. When a UE is in sleep mode, the UE may not be immediately reachable by the network. It would only be reachable when the device wakes up and does some signaling to the network, e.g. in conjunction to the periodic tracking area update (TAU) signaling (i.e. the periodic "keep alive" signaling in 3GPP networks). Devices using the UE sleep mode state will probably not communicate very often and are likely to be good candidates for belonging to the "infrequently communicating" devices, and hence benefit from the optimization proposed in this invD.

The problem with infrequently communicating devices in LTE networks is that the LTE standard is defined to use the "always connected" paradigm. That is, an attached LTE device does always have a PDN connection. And that will consume resources and create signaling in the network as described above.

SUMMARY OF THE INVENTION

Consequently, it is an object of the present invention to solve the above-mentioned problem and provide a method for reducing the resource usage for devices that only communicate very rarely and stay silent for long times. In particular it can be noted that the invention provides a core network optimization solution to minimize the signaling and consumed network resources for "infrequently communicating" devices.

In order to obtain this object, the present invention relates to a method of operating a network node in a telecommunication network, such as an MME, the method comprising: initiating a PDN connection revocable deletion procedure for a device when at least one predetermined criterion is fulfilled; sending a PDN connection revocable deletion request to another network node; receiving a PDN connection revocable deletion response message from said other second network node; and storing data indicating that a PDN connection with said device is revocably deleted.

In order to obtain said object, the invention also relates to a network node for a telecommunication network, such as an MME, said node being configured for: initiating a PDN connection revocable deletion procedure for a device when at least one predetermined criterion is fulfilled; sending a PDN connection revocable deletion request to another network node; receiving a PDN connection revocable deletion response message from said other second network node; and storing data indicating that a PDN connection with said device is revocably deleted.

In order to minimize the impact on the standard and avoid UE (device) impact, it is proposed to introduce new network procedures, referred to as a "PDN connection deletion with IP addresses reservation" procedure and a "PDN connection re-establishment using reserved IP addresses" procedure in the Evolved Packet System (EPS). That is, the EPS attach procedure is not changed and the default PDN connection is still established when the device is initially attaching, but after the attach has been done, the default PDN connection (and any other PDN connections of the device) are deleted (but can be revoked later) and resources released in the network, i.e. PDN Connection(s) are deleted in the PGW and SGW while the UE context and part of PDN connection (which is used to recover the deleted PDN connection) is kept in the MME.

The method according to the invention provides certain advantages, i.e. one or more of the following:
  resources in the network for infrequently communicating devices/terminals will be saved;

there are no PGW and no SGW resources required for suspended (i.e. being in revocable deletion state) devices;

it avoids unnecessary signaling, e.g. inter MME mobility and/or inter SGW mobility where the PGW does not need to be informed;

it improves the possibilities for operators to make sound business agreements with M2M service providers for use cases where devices communicate very little and seldom;

it improves and lowers the cost of machine type communication;

it has limited impacts on the existing system, and no impact on the UE (device) and no impact on the NAS protocols;

it saves network storage space; and it proposes a mechanism to provide a different treatment to those UE's that are configured for the machine type device communication without impact on legacy implementation.

BRIEF DESCRIPTION OF DRAWINGS

The invention will be described below with reference to certain embodiments and the enclosed drawings, in which.

DETAILED DESCRIPTION

According to an embodiment, a new functionality in the mobility management node, e.g. MME node, is provided. The functionality may be built into other similar types of network nodes, such as a SGSN which is used for GERAN/UTRAN, or an ePDG or a TWAN for non-3GPP-access, e.g. WLAN. Below, mostly the term MME is used, but it is noted that this is only used as an example.

Figure 1:
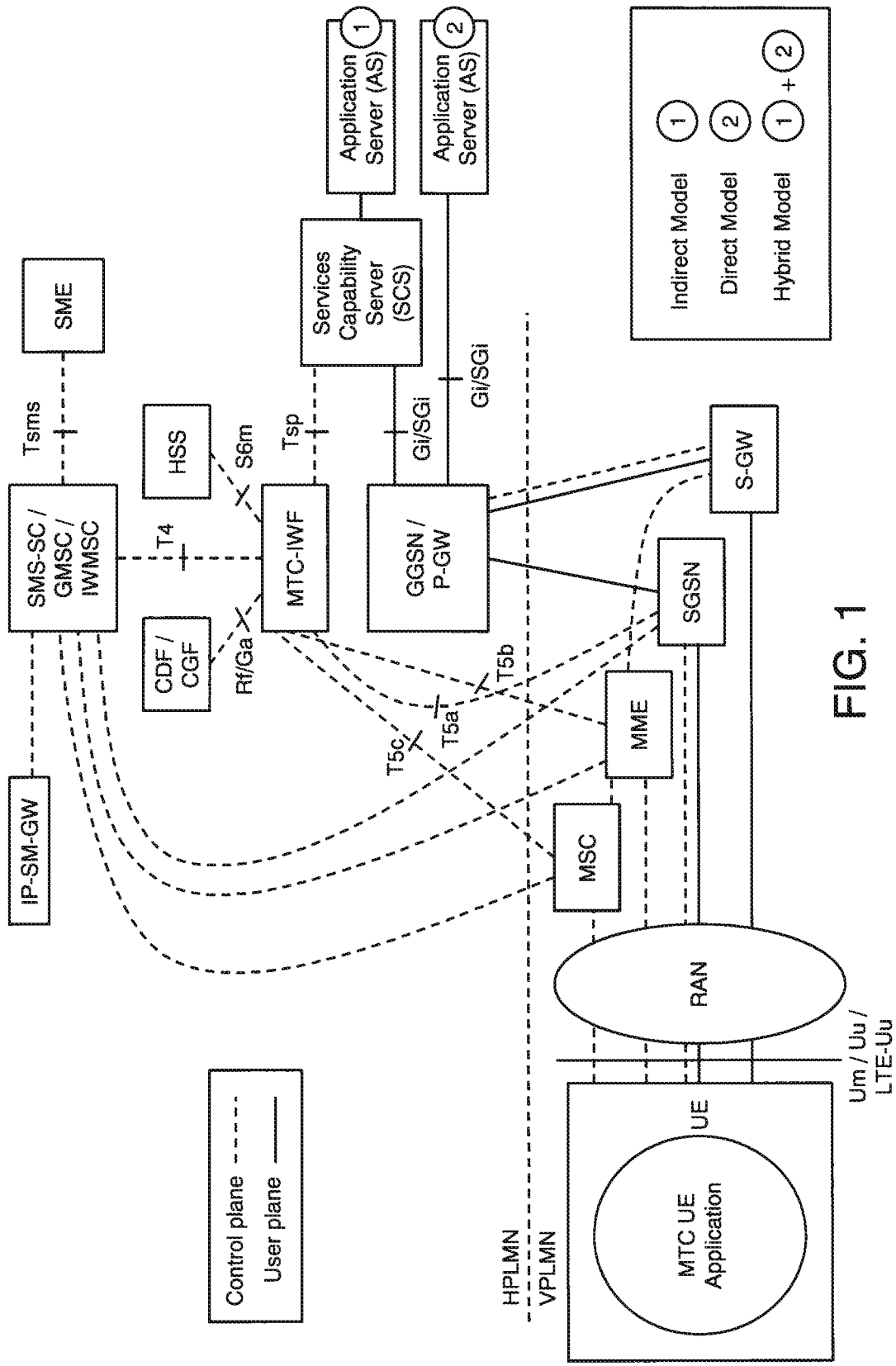
FIG. 1 is a schematical figure of a network in which the invention can be implemented.

FIG. 1 schematically shows an example of a network in which certain embodiments of the invention can be implemented. In FIG. 1, the dotted lines indicate communication between modules in the control plane. The continuous lines represent communication in the user plane.

A method of revocable deletion of PDN connections will now be described. Firstly, it should be noted that the new core network procedures are to delete the established PDN connection(s) on the network side without the UE knowing and to revoke them with the same IP address when they are needed again. The deletion can be triggered by the network (MME/SGSN/ePDG/non-3GPP-access) based on different criteria. Examples of such criteria are:

a certain time period after the attach procedure is finished;
when a device has been inactive for a certain time period;
when a device is moved to idle mode;
when a device goes into sleep mode;
a device which has a certain subscription parameter, set e.g. "infrequently communicating" device;
a device where collected traffic statistics of this device in the network show that resources would be saved if the suspend procedures are used;
a combination of two or more criteria above.

The revocable deletion function should be applied on UEs (i.e. devices) based on a parameter in the subscription information in HSS. It can also be enabled based on some indication from the UE/device e.g. the Low Access Priority Indication or other new or existing indication. It can also be enabled based on information configured into the MME (e.g. IMSI ranges) or configured into any other node.

Revocable deletion of PDN connection procedures should preferably only be done when the device is in idle mode. It is also transparent to the device, meaning that the device functionality does not need to be impacted in any way. According to an embodiment, when the PDN connection is deleted, the allocated resources for the PDN connection are released in the PGW and SGW. However, the PGW is required to place the allocated IP Addresses/prefix for the deleted PDN connection to a so-called reserved IP address pool, and the IP address/IPv6 Prefix shall not be allocated to any other PDN connection. Some resources related to the PDN connection may also be released in the MME, but sufficient information will be kept in the MME to enable the PDN connection to be re-established again by the revoke procedure.

When the PDN connection(s) are deleted for a device/UE, the device may not receive any DL traffic nor send any UL traffic. Neither may it receive any paging related to the PDN connection(s) e.g. paging due to downlink data notification (DDN) from DL IP packets arriving to the SGW. When traffic needs to be sent, the PDN connection will first be revoked.

Regarding IP address handling, it can be noted that when a PDN connection is deleted by the MME, the IP address(es) and/or IPv6 Prefix(es) of the PDN connection of the device may be either released or kept reserved by the network. If it is released a new IP address/IPv6 prefix will be assigned to the PDN connection when it is revoked. The device must then be informed of the new IP address/IPv6 prefix when it is revoked.

If the IP address(es)/IPv6 prefix(es) are "kept reserved during deletion", it/they must be stored until the PDN connection is revoked/re-established. This procedure may include a step of passing the IP address(es) or IPv6 Prefixes from the PGW to the MME at deletion, and back from the MME to the PGW at revoke (re-establishment).

A PDN connection normally only has one IP address but nothing prevents it from having several. For example, when it operates as a UE Gateway it may have more than one IP address. A PDN connection may also have both an IPv4 address and an IPv6 address (dual stack). For IPv6, the network (i.e. PGW) assigns only the first 64 bits of the IPv6 address i.e. the "IPv6 Prefix". The UE is assigns the last 64 bits itself, i.e. the "Interface Identifier", IID.

A process of notifying an SCS will now be described. In case the device is communicating with an SCS, the SCS may optionally be informed by the MME when the PDN connection(s) of a device are deleted and revoked. In this manner, the SCS knows it cannot initiate IP communication with the device, but needs to send a device trigger to the device for the device first to establish the PDN connection(s).

This notification could be sent from the MME (or SGSN) via the T5b (or T5a) interface to the MTC-IWF. If the MME knows the SCS identity of the device, it can include the SCS identity in the message to the MTC-IWF. The MTC-IWF resolves the address of the SCS by DNS and/or HSS query and forwards the deletion or revoke notification to the SCS.

The notification can also be sent from the PGW when a PDN connection is deleted or revoked. The RADIUS/Diameter protocol on the Gi/SGi interface may then be used. This interface may be enhanced in order to tell the SCS that the deletion of the PDN connection is revocable, so that the SCS knows that the deletion is not known by the device, only made internally in the network, and that the same IP address will be used when the connection later is up again.

Revoking a previously deleted PDN connection is done by the network (MME/SGSN/ePDG/non-3GPP-access) based on different triggering criteria. Examples of such criteria are:
- a Service Request for establishing the bearers is received from a device with a revocable deleted PDN connection;
- a Device Trigger is received in the MME for a device with a revocable deleted PDN connection.

The PDN connection revoke procedure is transparent to the device. When the PDN connection is revoked, the PDN connection is re-established. If the IP address has been kept reserved during the revocable deletion, the PDN connection shall be re-established using the same IP address/IPv6 prefix as was used before the revocable deletion.

The IP address/IPv6 Prefix shall then be included in the revoke message from MME to SGW/PGW.

When the network decides to revocable delete the PDN Connection of a device, i.e. when any of the criteria described above related to revocable deletion of PDN connections are fulfilled, the MME (or SGSN/ePDG/non-3GPP access) shall initiate the PDN connection deletion with reserved IP addresses procedure. When one of the criteria as mentioned above are fulfilled, the network decides to revoke the PDN Connection, and the MME (or SGSN/ePDG/non-3GPP access) shall initiate the PDN connection re-establishment with reserved IP addresses procedure. Instead of a MME, other network nodes could perform the methods described, such as a SGSN, ePDG, or TWAN for non-3GPP access. In case of ePDG/TWAN, there is no SGW in the network of FIG. 1.

A so-called PDN connection deletion with reserved IP addresses procedure may use existing procedures with some modifications, e.g. UE or MME requested PDN disconnection which is using Delete Session Request/Response message, or MME initiated Suspend procedure when UE performs CSFB or SRVCC to a non-DTM supported RAN which is using Suspend Notification/Acknowledge message. This procedure is currently specified in 3GPP to be only used for suspend User plane. However, according to a embodiment, the procedure evolves to delete the PDN Connection in SGW and PGW. Alternatively, this procedure can be defined as a complete new procedure using new signaling messages.

According to an embodiment, information is exchanged between the MME and the PGW comprising a new indication which indicates to the PGW that the IP address(es)/IPv6 Prefix that have been allocated for the revocable deleted PDN connection, shall remain reserved in the PGW and not be moved to the pool of free IP address/IPv6 Prefixes of the PGW, and that the PGW shall include the UE's IP address/IPv6 Prefixes in the revocable deletion response message. The reserved IP address(es)/IPv6 Prefix(es) shall preferably be stored in the MME.

If existing messages are to be re-used, a new indication, referred to as a "revocable deletion indication" can be included in the revocable deletion request message e.g. Delete Session Request message or Suspend Notification, and in the revocable deletion response message, e.g. the Delete Session Response or Suspend Acknowledge message, a new parameter carrying the IP addresses/IPv6 Prefix of the PDN Connection may be returned to the MME (for storage until the PDN connection is revoked).

Both messages between the MME⇆SGW and between SGW⇆PGW are modified in the same way.

Alternatively, a pair of new GTPv2-C/PMIPv6 messages can be used for this PDN connection deletion with reserved IP procedure.

The MME/SGSN initiated PDN connection deletion with reserved IP addresses procedure is triggered when a criteria is fulfilled as specified in the section above describing revoking a previously deleted PDN connection. In the following description with reference to FIG. 2, a PDN connection revocable deletion request/response is a general term, which may represent a new pair of GTP messages or reuse existing GTP messages e.g. Delete Session Request/Response or Suspend Notification/Acknowledge.

Figure 2:
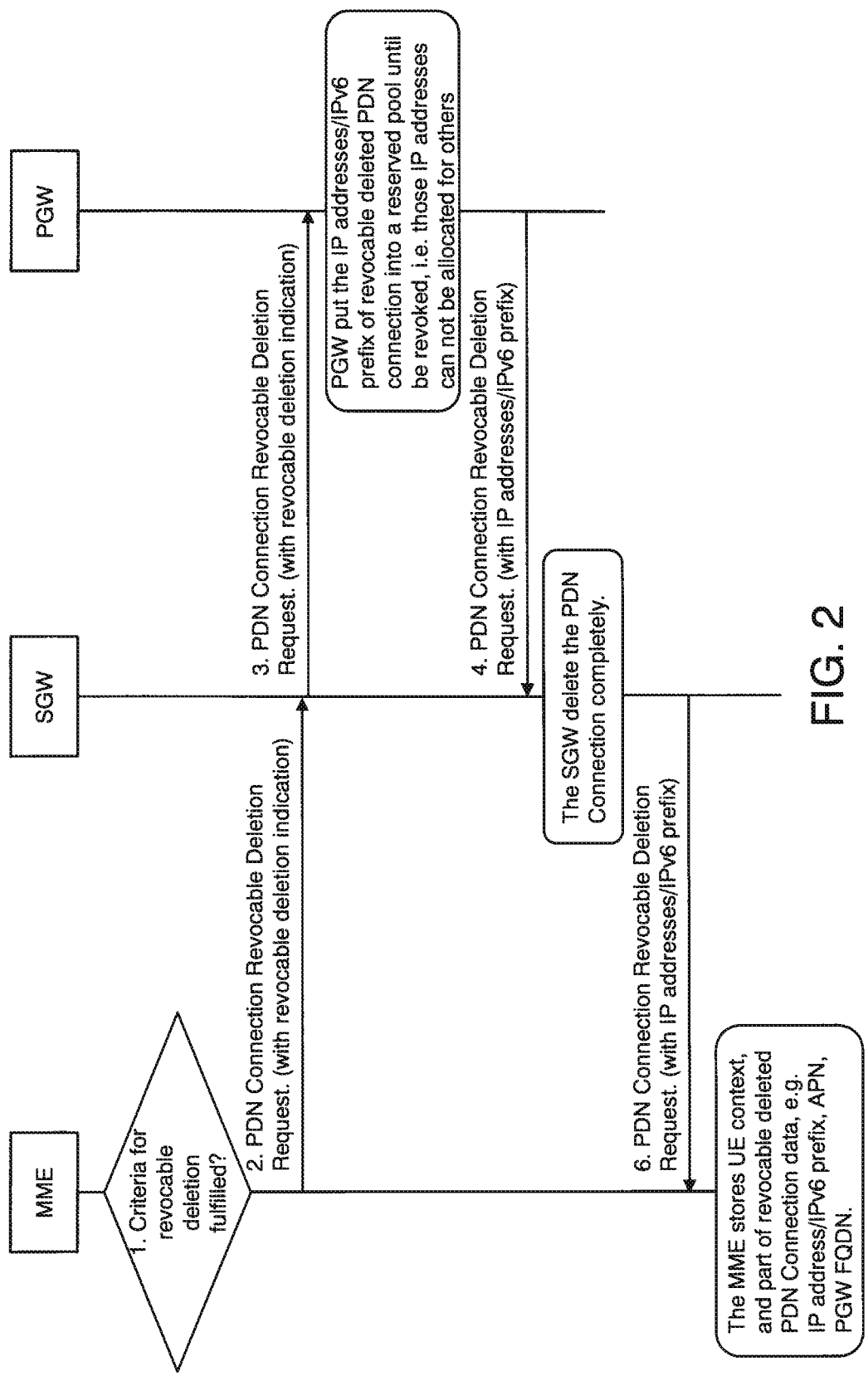
FIG. 2 is a communication scheme of the so-called "PDN connection deletion with reserved IP addresses procedure" according to an embodiment of the invention.

FIG. 2 shows a communication scheme of the so-called PDN connection deletion with reserved IP addresses procedure according to an embodiment. The following steps are executed by the different nodes indicated in FIG. 2:
1. The MME/SGSN initiates the PDN connection revocable deletion procedure when one or more of the criteria above is fulfilled.
2. The MME/SGSN sends a PDN connection revocable deletion request to the SGW via S4/S11 interface. The SGW forwards the received PDN connection revocable deletion request to the PGW via S5/S8 GTP or S5/S8 PMIP.
3. The PGW deletes the PDN Connection data. If the IP address/IPv6 Prefix of the PDN connection shall be kept reserved, then the IP address/IPv6 Prefix of the PDN connection shall not be placed in the pool of free IP addresses/IPv6 Prefixes. When the PDN Connection data has been deleted, the PGW is going to discard any received UE downlink data (as for any non-existent PDN connections). The TEID or GRE tunnel with the SGW is released.
4. The PGW responses to the SGW with PDN connection revocable deletion response message including the IP address/IPv6 Prefix of the deleted PDN connection.
5. When receiving the response from PGW, the SGW completely releases the UE context and the TEID or GRE tunnel with the PGW.
6. The SGW forwards PDN connection revocable deletion response message to the MME/SGSN. The MME keeps the UE context and marks PDN contexts as revocable deleted and just keeps some of the stored data for a revocable deleted PDN Connection e.g. the IP address/IPv6 Prefix of the suspended PDN connection, PGW FQDN, APN information. The PGW FQDN is used to find exactly the same PGW again when the PDN connection is revoked.

The so-called PDN connection re-establishment with reserved IP addresses procedure may be a complete new procedure or reuse the existing procedure, e.g. E-UTRAN Initial UE attach procedure or Resume Notification procedure defined in TS 23.216 and TS 23.272.

According to an embodiment, information is exchanged here between the MME and the PGW via the SGW. The stored IP address(es)/IPv6 Prefix, if available, are included by the MME into the message to the PGW, as if static IP address/prefix was used in the revoke request message.

If the existing signaling messages are to be re-used, a new indication is also needed to inform the PGW it is a revoke procedure. The PGW will accept IP address included by the MME and remove it from the reserved IP address/IPv6 Prefix pool (if it kept such a pool).

Both the message between the MME⇆SGW and between the SGW⇆PGW are modified in the same way. The SGW is just forwarding the new parameters.

Alternatively new pair of GTPv2-C/PMIPv6 messages can be used for the procedure.

The PDN connection re-establishment with reserved IP addresses procedure is triggered when one or more criteria for revoking a PDN connection as specified above in chapter 6.1 is fulfilled. In the following description with reference to FIG. 3, the PDN connection revoke request/response is used as a general term, which may also represent a new pair of GTP messages or reuse existing GTP messages or the reuse of existing GTP messages e.g. Create Session Request/Response or Resume Notification/Acknowledge.

Figure 3:
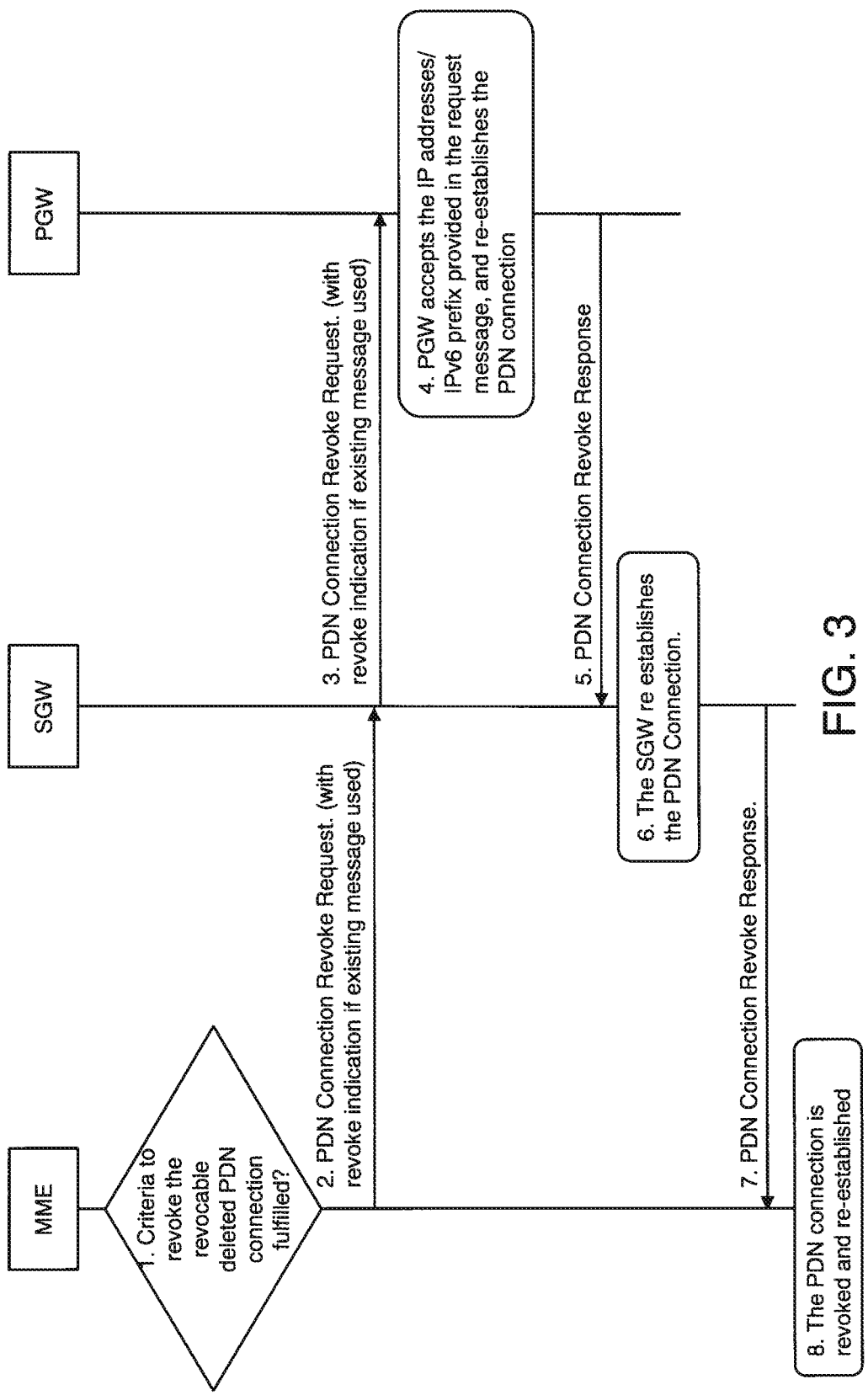
FIG. 3 shows a communication scheme of the so-called "PDN connection re-establishment with reserved IP addresses procedure" according to an embodiment of the invention.

FIG. 3 shows a communication scheme of the so-called "PDN connection re-establishment with reserved IP addresses procedure" according to an embodiment. The following steps are executed by the different nodes indicated in FIG. 3:

1. The MME/SGSN initiates the PDN connection re-establishment with reserved IP addresses procedure when one or more criteria above are fulfilled.
2. The MME/SGSN sends a PDN connection revoke request message with the stored UE's IP address to the SGW via S4/S11 interface. If the existing messages are used, the SGW & PGW will interpret the included IP address/IPv6 Prefix as a static IP address and uses that instead of allocating a new in the pool of free IP addresses/IPv6 prefixes. Another new indication flag may be included to explicitly tell the PGW it is PDN connection re-establishment with reserved IP addresses procedure.
3. The SGW forwards the received PDN connection revoke Request message to the PGW via S5/S8 GTP or S5/S8 PMIP.
4. The PGW revokes the deleted PDN Connection, e.g. re-establishing the TEID or GRE tunnel with the SGW, so DL/UL data forwarding is resumed. If an IP address/IPv6 Prefix is included in the received message, the PGW uses that address/prefix instead of allocating a new IP address. The PGW may alternative find the reserved IP address/Prefix stored somewhere else, e.g. in the PGW itself. The IMSI in the request message is then used to find the stored IP address.
5. The PGW responds to the SGW with PDN connection revoke response message.
6. When receiving the response from PGW, the SGW setup the PDN Connection, e.g. allocating TEID or GRE, so DL/UL data forwarding is also resumed.
7. The SGW forward PDN connection revoke response message to the MME/SGSN.
8. The PDN connection(s) are revoked by the network.

Regarding idle mode mobility, it can be noted that at any idle mode inter MME/SGSN mobility, the information related to the revocable deletion, e.g. Revocable deletion Indication, stored IP addresses/IPv6 Prefix may be included during context transfer procedure. The so-called target MME/SGSN shall take over the responsibility for resuming the PDN connections when needed. If the target MME/SGSN does not support revocable deletion/revoke procedure, the revocable deleted PDN connections may be revoked by the source MME/SGSN as part of the mobility procedure before the target MME/SGSN takes over the responsibility.

Furthermore, regarding a notification of a revocable deletion of PDN Connection it can be noted that a notification may optionally be sent by the MME or the PGW to the SCS as detailed described in the following claues when the PDN connection(s) for a device is revocably deleted and when it is revoked. The SCS can then avoid trying to send IP packets to the device while revocable deleted, which will save some resources in the SCS and the network and shorten the time for when the SCS understands it need to fallback to device triggering.

If the SCS is not aware of the revocably deleted PDN connection of a device and starts to send IP packets to the device, the PGW will just discard the IP packets. The SCS will then after some time understand that the device is not reachable at the moment.

For the optional notification there are a few alternatives on how to notify an SCS of a revocable deletion or revoke event. Among these alternatives are notifications over the T5 interface, over the S6a interface and over the PGW.

Referring firstly to the T5 interface, it is noted that the revocable deletion notification and revoke notifications can be sent to the SCS over T5b/a and Tsp interface.

The revocable delete notification procedure is triggered when the PDN connection(s) of a device are revocable deleted. The following steps may be performed:

1. The MME/SGSN initiates the revocable deletion notification procedure when the PDN connection(s) of a device are revocable deleted.
2. The MME/SGSN sends a revocable deletion notification request to the MTC-IWF via T5 interface. If the MME knows the SCS, it may include the SCS ID or address in the notification message. If the MME knows the External ID it may include the External ID in the notification message
3. The MTC-IWF retrieves the UE's External Identifier and the SCS ID/address from HSS via S6m interface (if not received in step 2).
4. Once having the UE's External Identifier and its SCS address, the MTC-IWF sends a revocable deletion notification request with the UE's external identifier to the SCS via Tsp interface.
5. The SCS marks the device/UE as revocable deleted. No IP communication should be initiated to the device without doing a prior device triggering procedure.
6. A revocable deletion confirmation message may be sent back to MTC-IWF via Tsp interface, which may forward it to MME/SGSN over T5b/a interface.

Furthermore, the revoke notification procedure is triggered when the PDN connection(s) of a device are revoked. This may include the following steps:

1. The MME/SGSN initiates the revoke notification procedure when the PDN connection(s) of a device are revoked.
2. The MME/SGSN sends a revoke notification request to the MTC-IWF via T5 interface. If the MME knows the SCS, it may include the SCS ID or address in the notification message. If the MME knows the External ID it may include the External ID in the notification message
3. The MTC-IWF retrieves the UE's External Identifier and the SCS ID/address from HSS via S6m interface (if not received in step 2).
4. Once having the UE's External Identifier and its SCS address, the MTC-IWF sends a revoke notification request with the UE's external identifier to the SCS via Tsp interface.
5. The SCS unmarks the suspension of the device/UE. The device should now be reachable for IP communication.
6. A revoke confirmation message may be sent back to MTC-IWF via Tsp interface, which may forward it to MME/SGSN over T5b/a interface.

The revocable deletion notification procedure is triggered when the PDN connection(s) of a device are revocable deleted. This may include the following steps:

1. The MME/SGSN initiates the revocable deletion notification procedure when the PDN connection(s) of a device are revocable deleted.

2. The MME/SGSN sends a revocable deletion notification request to the HSS via S6a interface. The HSS may inform the MTC-IWF over S6m interface.
3. The HSS/MTC-IWF shall mark the UE as revocable deleted.
4. Or, the MTC-IWF sends a revocable deletion notification request with the UE's external identifier to the SCS via Tsp interface.
5. The SCS shall mark the device/UE as revocable deleted. No IP communication should be initiated to the device without doing a prior device triggering.

Regarding revoke notification, it is noted that the revoke notification procedure is triggered when the PDN connection(s) of a device are revoked. This may include the following steps:
1. The MME/SGSN initiates the revoke notification procedure when the PDN connection(s) of a device are revoked.
2. The MME/SGSN sends a revoke notification request to the HSS via S6a interface. The HSS may inform the MTC-IWF over S6m interface.
3. The HSS/MTC-IWF shall reset any revocable deletion mark for the UE.
4. Or, the MTC-IWF sends a revoke notification request with the UE's external identifier to the SCS via Tsp interface.
5. The SCS shall unmark the suspension of the device/UE. The device should now be reachable for IP communication.

Furthermore, the revocable deletion/revoke notification can be sent to the SCS over PGW and MTC-AAA interface (SGi/Diameter).

The revocable deletion notification procedure is triggered when the PDN connection(s) of a device are revocable deleted. This may include the following steps:
1. The MME/SGSN initiates the revocable deletion procedure.
2. Once the PDN connection is revocable deleted in the PGW, the PGW sends a revocable deletion notification to the MTC-AAA. This may be part of the normal RADIUS/Diameter messaging on SGi/Gi, e.g. using a new indication in the existing message.
3. The MTC-AAA retrieves the UE's External Identifier from HSS.
4. Once the UE's External Identifier is received from the HSS, the MTC-AAA forwards the revocable deletion notification with the UE's external identifier to the SCS. This may be a new indication as part of the normal RADIUS/Diameter messaging on SGi/Gi.
5. The SCS marks the device/UE as revocable deleted. No IP communication should be initiated to the device without doing a prior device triggering.

The revoke notification procedure is triggered when the PDN connection(s) of a device are revoked. This may include the following steps:
1. The MME/SGSN initiates the revoke procedure.
2. Once the PDN connection is re-established in the PGW, the PGW sends a revoke notification to the MTC-AAA. This may be a new indication as part of the normal RADIUS/Diameter messaging on SGi/Gi.
3. The MTC-AAA retrieves the UE's External Identifier from HSS.
4. Once the UE's External Identifier is received from the HSS, the MTC-AAA forwards the revoke notification with the UE's external identifier to the SCS. This may be a new indication as part of the normal RADIUS/Diameter messaging on SGi/Gi.
5. The SCS unmarks the revoked deletion of the device/UE. The device should now be reachable for IP communication.

The following protocols may be impacted due to the revocable deletion/revoke procedure suggested above:
S4/S11 GTPv2-C: new messages or new indicators for MME/SGSN to inform the SGW of revocable deletion/revoke PDN connections
S10 GTPv2-C: new parameters in transferred contexts at idle mode mobility procedures
S5/S8 GTPv2-C: new messages or new indicators for SGW to inform the PGW of revocable deletion/revoke PDN connections
S5/S8 PMIP: new PMIP messages or new indicators in BRI message for SGW to inform the PGW of revocable deletion/revoke PDN connections
T5b/T5a: new messages or new indicators for MME/SGSN to inform the MTC-IWF for revocable deletion/revoke notifications and confirmations
Tsp: new messages or new indicators for MTC-IWF to inform the SCS of revocable deletion/revoke of device connections.

Figure 4:
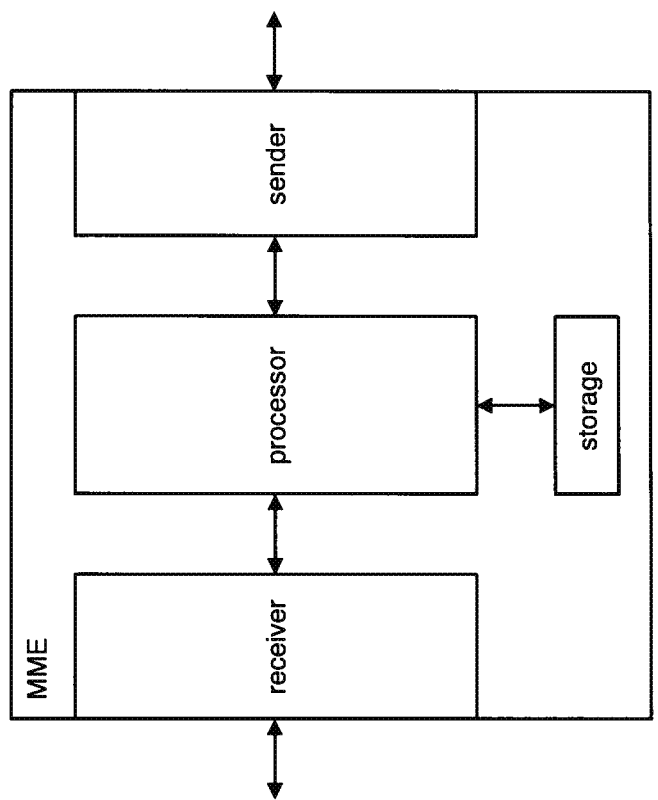
FIG. 4 schematically shows an example of a network node, in this case an MME.

FIG. 4 schematically shows an example of a network node, in this case an MME. The MME comprises a processor for executing commands. Furthermore, the MME comprises a receiver and a sender unit to communicate with other nodes in a telecommunication network. In this example, the MME also comprises a storage for storing information. The processor may be configured to execute the method step described above and store information, e.g. the IP address(es)/IPv6 prefix(es), in the local storage shown in FIG. 4. The PGW and SGW described above may be represented by the structure of FIG. 4 as well.

It can be noted that the above described embodiments are not restricted to the use in LTE networks. The embodiments may as well be used in GERAN/UTRAN and in other non-3GPP access, e.g. WLAN. The embodiments described above are merely intended to explain the invention, and are not restrictive to the scope of the invention.

ABBREVIATIONS

3GPP $3^{rd}$ Generation Partnership Project
AS Application Server
CDF Charging Data Function
CGF Charging Gateway Function
DL Downlink
EPC Evolved Packet Core
ePDG evolved Packet Data Gateway
EPS Evolved Packet System
FQDN Fully Qualified Domain Name
GGSN GPRS Gateway Serving Node
SGI It is the reference point between the PDN GW and the packet data network. Packet data network may be an operator external public or private packet data network or an intra operator packet data network, e.g. for provision of IMS services. This reference point corresponds to Gi for 3GPP accesses.
GRE Generic Routing Encapsulation
HPLMN Home Public Land Mobile Network
HSS Home Subscriber Services
IP Internet Protocol
IP-SM-GW IP-Short Message-Gateway
IWF Interworking Function
IWMSC InterWorking MSC
LTE Long Term Evolution
M2M Machine to Machine MME Mobility Management Entity
MTC Machine Type Communication
PDN Public Data Network
PGW Packet Data Network Gateway
RAN Radio Access Network
SAE System Architecture Evolution
SCS Service Capability Server
SGW Servicing Network Gateway
SGSN Serving GPRS Support Node
SME Short Message Entity
SMC-SC Short Message Service-Service Centre
TAU Track Area Update
TEID Tunneling Endpoint Identifier
UE User Equipment
UL Uplink
VPLMN Visited Public Land Mobile Network

The invention claimed is:

1. A method of operating a mobility management node (MMN) in a telecommunication network, the method comprising:
    initiating, by the MMN, a packet data network (PDN) connection revocable deletion procedure for a device managed by the MMN when at least one predetermined criterion is fulfilled;
    sending, by the MMN, a PDN connection revocable deletion request to a network gateway node;
    receiving, at the MMN, a PDN connection revocable deletion response message from said gateway node; and
    storing, at the MMN, data indicating that a PDN connection with said device is revocably deleted, wherein the data indicating that a PDN connection with said device is revocably deleted is stored at the MMN for later use.

2. The method according to claim 1, comprising:
    initiating a PDN connection re-establishment procedure when one or more criteria different than the at least one predetermined criterion are fulfilled;
    sending a PDN connection revoke request message including an Internet Protocol (IP) address of said device to said gateway node; and
    receiving from said gateway node a PDN connection revoke response message.

3. The method of claim 1, wherein
    the step of initiating a packet data network (PDN) connection revocable deletion procedure for a device when at least one predetermined criterion is fulfilled consists of the MMN determining whether a certain first condition exists, wherein determining whether said certain condition exists comprises the MMN determining whether said predetermined criterion is fulfilled,
    the step of sending the revocable deletion request to a gateway node is performed by the MMN as a consequence of the MMN determining that said certain condition exists,
    the method further comprises: the gateway node, in response to receiving the revocable deletion request, i) reserving an Internet Protocol (IP) address or IP address prefix associated with PDN connection data associated with the device such that the IP address or IP address prefix cannot be allocated to another device and ii) deletes the PDN connection data, and
    the response message transmitted by the gateway node comprises the reserved IP address or IF address prefix, and
    the method further comprises the MMN storing the reserved IP address or IP address prefix after receiving the response message.

4. The method of claim 3, further comprising:
    the MMN receiving a certain message pertaining to the device after sending the revocable deletion request;
    the MMN transmitting a revoke request as a consequence of receiving the certain message, the revoke request comprising the reserved IP address or IP address prefix;
    the gateway node receiving the revoke request;
    the gateway node allocating the IP address or IP address prefix to the device as a consequence of receiving the revoke request.

5. The method of claim 4, wherein determining whether said predetermined criterion is fulfilled comprises determining one of:
    i) whether at least a certain amount of time has elapsed since the device completed an attach procedure;
    ii) whether the device has been inactive for at least a certain amount of time; and
    iii) whether the device is in an idle or sleep mode.

6. The method of claim 4, wherein the certain message pertaining to the device is a service request message transmitted by the device.

7. The method of claim 4, further comprising
    one of the MMN and the gateway node transmitting towards a server a revocable deletion notification for notifying the server that a PDN connection associated with the device has been revocably deleted.

8. The method of claim 1, further comprising performing, by the MMN, a handover procedure for handing said device over to a new MMN, wherein performing the handover procedure comprises:
    the MMN determining whether the new MMN is operable to re-establish the revocably deleted PDN connection,
    in response to determining that the new MMN is not operable to re-establish the revocably deleted PDN connection, the MMN initiating a PDN connection re-establishment procedure for re-establishing the revocably deleted PDN connection, and
    after re-establishing the revocably deleted PDN connection, the MMN transmitting to the new MMN context information for said device.

9. The method of claim 1, wherein
    the PDN connection with said device is associated with an IP address or IP address prefix previously allocated to said device,
    the method further comprises transmitting, by the MMN, a revoke request message comprising the IP address or IP address prefix previously allocated to said device; and
    re-establishing, by the MMN, a PDN connection with said device using the IP address or IP address prefix.

10. The method of claim 1, further comprising transmitting, by one of the MMN and the gateway node, a revocable deletion notification to a home subscriber server (HSS) for notifying the HSS that a PDN connection associated with said device has been revocably deleted.

11. The method of claim 10, further comprising sending, by one of the MME and the gateway node, a revoke notification request to the HSS.

12. The method of claim 1, further comprising:
    sending, by one of the MMN and the gateway node, a revocable deletion notification to a MachineType Device Communication Interworking Function (MTC-IWF); and,
    receiving, at the one of the MMN and the gateway node, a revocable deletion confirmation message from the MTC-IF.

13. The method of claim 12, further comprising:
sending, by one of the MMN and the gateway node, a revoke notification request to the MTC-IWF; and,
receiving, at the one of the MMN and the gateway node, a revoke notification confirmation message from the MTC-IWF.

14. The method of claim 1, further comprising:
sending, by one of the MME and the gateway node, a revocable deletion notification request to a Machine Type Device Communication—Authentication, Authorization, and Accounting (MTC-AAA).

15. The method of claim 14, further comprising sending, by one of the MME and the gateway node, a revoke notification request to the MTC-AAA.

16. A mobility management node (MMN) for a telecommunication network, said MMN comprising: a transmitter, a storage unit, and a processor coupled to the storage unit, the processor being configured for:
determining whether a certain condition exists;
employing the transmitter to transmit a packet data network (PDN) connection revocable deletion request for a device managed by the MMN as a consequence of determining that said certain condition exists; and
storing, in the storage unit of the MMN, data indicating that a PDN connection with said device is revocably deleted in response to the MMN receiving a deletion response message transmitted by a gateway node in response to the revocable deletion request, wherein the data indicating that a PDN connection with said device is revocably deleted is stored at the MMN for later use.

17. The MMN of claim 16, wherein
the deletion response message transmitted by the gateway node comprises an Internet Protocol (IP) address or IP address prefix previously allocated to the device and currently reserved for the device, and
the processor is configured for storing the reserved IP address or IP address prefix.

18. The MMN of claim 17, wherein the processor is further configured for transmitting a revoke request as a consequence of the MMN receiving a certain message, the revoke request comprising the reserved IP address or IP address prefix.

19. The MMN of claim 18, wherein determining whether said condition exists comprises: determining whether the device has a certain subscription parameter and determining one or more of: i) whether at least a certain amount of time has elapsed since the device completed an attach procedure; ii) whether the device has been inactive for at least a certain amount of time; and iii) whether the device is in an idle or sleep mode.

20. The method of claim 17, wherein the method further comprises:
a third network node receiving the revocable deletion request transmitted by the MMN and then forwarding the revocable deletion request to the gateway node.

* * * * *

UNITED STATES PATENT AND TRADEMARK OFFICE
CERTIFICATE OF CORRECTION

PATENT NO. : 9,241,364 B2  
APPLICATION NO. : 13/805088  
DATED : January 19, 2016  
INVENTOR(S) : Ronneke et al.

Page 1 of 1

It is certified that error appears in the above-identified patent and that said Letters Patent is hereby corrected as shown below:

In Column 11, Line 63, in Claim 3, delete "IF" and insert -- IP --, therefor.

In Column 14, Line 23, in Claim 20, delete "The method" and insert -- The MMN --, therefor.

Signed and Sealed this  
Seventh Day of June, 2016

Michelle K. Lee  
*Director of the United States Patent and Trademark Office*